Patented Jan. 16, 1951

2,537,976

UNITED STATES PATENT OFFICE 2,537,976

AMINO-ANTHRAQUINONE COMPOUNDS CONTAINING A TRIFLUOROMETHYL GROUP AND A POLYFLUOROALKYL-AMINO GROUP

Joseph B. Dickey and Edmund B. Towne, Rochester, N. Y., assignors to Eastman Kodak Company, Rochester, N. Y., a corporation of New Jersey No Drawing. Application October 6, 1948, Serial No. 53,136

4 Claims. (Cl. 260—379)

This invention relates to new anthraquinone compounds and their application to the art of dyeing or coloring.

We have discovered that the anthraquinone compounds having the formula:

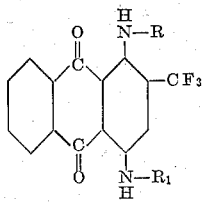

wherein R stands for a member selected from the group consisting of a hydrogen atom, an alkyl group having 1 to 4 carbon atoms, a hydroxyalkyl group having 2 to 3 carbon atoms, a —CH$_2$CH$_2$—O—CH$_2$CH$_2$OH group and a —CH$_2$CH$_2$—O—CH$_2$CH$_2$—O—CH$_2$CH$_2$OH group and R$_1$ stands for a member selected from the group consisting of a 2,2-difluoroethyl group, a 2,2-difluoropropyl group, a 3,3-difluoropropyl group, a 3,3-difluorobutyl group, a 2,2,2-trifluoroethyl group, a 3,3,3-trifluoropropyl group, an α-trifluoromethylethyl group and an α-difluoromethylethyl group are valuable dyes for coloring textile materials made of or containing a cellulose alkyl carboxylic acid ester having two to four carbon atoms in the acid groups thereof. They are particularly of use for the coloration of cellulose acetate textile materials.

It is an object of our invention to provide new anthraquinone dye compounds. Another object is to provide a satisfactory process for the preparation of the new anthraquinone dye compounds of the invention. A further object is to provide dyed cellulose alkyl carboxylic acid ester textile materials which possess good to excellent fastness to light and gas. A particular object is to provide new anthraquinone compounds which are especially of value for the dyeing of cellulose acetate textile materials.

By cellulose alkyl carboxylic acid esters having two to four carbon atoms in the acid groups thereof we mean to include, for example, both hydrolyzed and unhydrolyzed cellulose acetate, cellulose propionate, cellulose butyrate, cellulose acetate-propionate and cellulose acetate-butyrate. Our new anthraquinone compounds color textile materials made of the aforesaid cellulose alkyl carboxylic acid esters blue, red-blue and violet shades.

The anthraquinone compounds of our invention are prepared by condensing an anthraquinone compound having the formula:

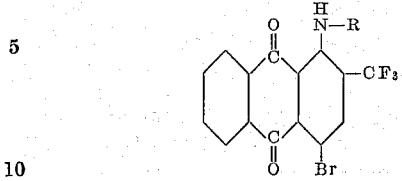

wherein R has the meaning previously assigned to it with a primary amine having the formula:

R$_1$NH$_2$ wherein R$_1$ has the meaning previously assigned to it. The condensation is ordinarily effected under reflux in the presence of an inert diluent such as normal butyl alcohol, normal amyl alcohol or pyridine. Normally the condensation reaction just referred to is carried out in the presence of a copper salt catalyst although in some instances the presence of a catalyst is not necessary. So far as we are aware almost any cupric salt is useful as a catalyst. Thus, cupric sulfate (either with or without water of crystallization), cupric acetate, cupric bromide, cupric chloride and cupric iodide can be used. The use of cupric sulfate and cupric acetate is preferred. Similarly, an acid-binding agent such as potassium acetate is usually present during the reaction.

As indicated in the examples, the compounds can be purified by crystallization from a solvent such as xylene or toluene. Also, while the utility of the compounds of our invention will be illustrated with reference to the dyeing or coloration of cellulose acetate textile materials, it will be understood that they color the other textile materials referred to hereinbefore generally similar shades.

The following examples illustrate the anthraquinone compounds of our invention and the manner in which they may be prepared.

*Example 1*

10 grams of 1-amino-2-trifluoromethyl-4-bromoanthraquinone are heated under reflux in 100 cc. of normal butyl alcohol with 5 grams of 2,2,2-trifluorethylamine using 0.1 gram of copper sulfate as a catalyst and 3 grams of potassium acetate to react with the hydrogen bromide that forms. When no further color change toward the violet (3-6 hours) occurs the reaction is stopped, the reaction mixture is filtered while hot and the filtrate obtained is concentrated to 50 cc. by distillation under reduced pressure and cooled in a refrigerator. Upon filtration, a crystalline dye compound having the formula:

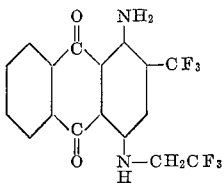

is obtained. If desired, it may be purified by crystallization from xylene or toluene. It colors cellulose acetate textile materials violet shades from an aqueous suspension.

Example 2

10 grams of 1-amino-2-trifluoromethyl-4-bromoanthraquinone are heated under reflux in 100 cc. of normal butyl alcohol with 4.2 grams of 2,2-difluoroethylamine using 0.1 gram of copper sulfate as a catalyst and 3 grams of potassium acetate to react with the hydrogen bromide formed. Heating is continued until no further color change takes place. The reaction mixture is then filtered while hot and concentrated by distillation under reduced pressure to about 40 cc. Upon cooling, 1-amino-2-trifluoromethyl-4-2,2,2-trifluoroethylamino-anthraquinone having the formula:

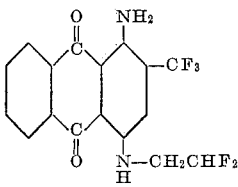

crystallizes out and is recovered by filtration. If desired, it may be purified by crystallization from xylene or toluene. It colors cellulose acetate textile materials reddish-blue shades from an aqueous suspension.

Example 3

10 grams of 1-β-hydroxyethylamino-2-trifluoromethyl-4-bromoanthranthraquinone, 3 grams of potassium acetate, 4 grams of 2,2,2-trifluoroethylamine, 0.1 gram of copper sulfate and 100 cc. of n-butyl alcohol are heated under reflux until no further color change takes place. The reaction mixture is filtered while hot and the filtrate is concentrated by distillation under reduced pressure to about 40 cc. Upon cooling, 1-β-hydroxyethylamino - 2 - trifluoromethyl-4-trifluoroethylamino-anthraquinone precipitates out and is recovered by filtration. It has the formula:

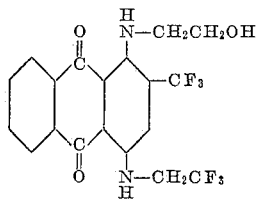

and colors cellulose acetate textile materials reddish-blue shades from an aqueous suspension.

Example 4

10 grams of 1-methylamino-2-trifluoromethyl-4-bromoanthraquinone, 5 grams of 2,2,2-trifluoroethylamine, 100 cc. of n-butyl alcohol, 3 grams of potassium acetate and 0.1 gram of copper sulfate are refluxed together until no further color shift toward reddish-blue takes place. The reaction mixture is filtered hot, concentrated to 35 cc. and cooled. 1-methylamino-2-trifluoromethyl-4-trifluoroethylamino-anthraquinone precipitates out and is recovered by filtration. It colors cellulose acetate textile materials red-blue shades from an aqueous suspension.

Example 5

10 grams of 1-amino-2-trifluoromethyl-4-bromoanthraquinone, 5 grams of 1,1,1-trifluoro-2-aminopropane

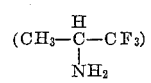

3 grams of potassium acetate, 0.1 gram of copper sulfate and 100 cc. of n-butyl alcohol are heated together under refluxing conditions until no further color change takes place. The reaction mixture is filtered while hot and then concentrated by distillation under reduced pressure to about 40 cc. Upon cooling, 1-amino-2-trifluoromethyl-4-α-trifluoromethylethylamino - anthraquinone precipitates out and is recovered by filtration. It has the formula:

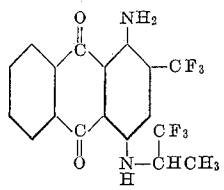

and colors cellulose acetate textile materials violet shades.

Example 6

10 grams of 1-β-hydroxyethoxyethylamino-2-trifluoromethyl-4-bromoanthraquinone, 4 grams of 2,2,2-trifluoroethylamine, 3 grams of potassium acetate, 0.1 gram of copper sulfate and 100 cc. of n-butyl alcohol are refluxed together until no further color change toward the red-blue takes place. The reaction mixture is filtered while hot and the filtrate obtained is concentrated to 45 cc. by distillation under reduced pressure. After cooling, the reaction mixture is filtered and 1-β-hydroxyethoxyethylamino-2-trifluoromethyl - 4 - 2,2,2 - trifluoroethylamino-anthraquinone having the formula:

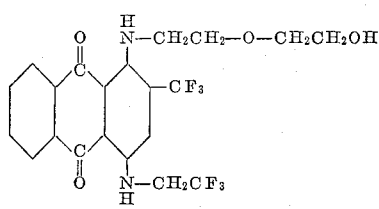

is obtained. It colors cellulose acetate textile materials red-blue shades.

By the use of 4.5 grams of 3,3,3-trifluoropropylamine in place of 2,2,2-trifluoroethylamine in the foregoing example 1-β-hydroxyethoxyethylamino-2-trifluoromethyl-4-3,3,3 - trifluoropropylamino-anthraquinone which colors cellulose acetate textile materials blue shades is obtained.

Example 7

10 grams of 1-β-hydroxyethoxy-β-ethoxyethylamino - 2 - trifluoromethyl-4-bromoanthraquinone, 4 grams of 2,2,2-trifluoroethylamine, 100 cc. of n-butyl alcohol, 3 grams of potassium acetate and 0.1 gram of copper sulfate are heated together under reflux until no further color change toward the red-blue occurs. The reaction mixture is worked up as described in Example 6 to obtain 1-β-hydroxyethoxy-β-ethoxyethylamino- 2 -trifluoromethyl-4-2,2,2-trifluoroethylamino-anthraquinone which has the formula:

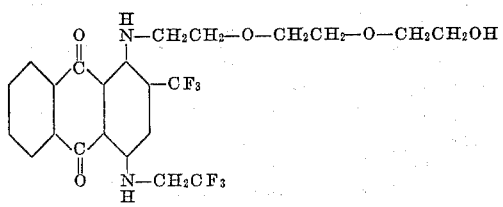

and which colors cellulose acetate textile materials red-blue shades.

By the use of 4.5 grams of 3,3,3-trifluoropropylamine in place of 2,2,2-trifluoroethylamine in the foregoing example 1-β-hydroxyethoxy-β-ethoxyethylamino-2-trifluoromethyl-4-3,3,3 - trifluoropropylamino-anthraquinone which colors cellulose acetate textile materials blue shades is obtained.

*Example 8*

10 grams of 1-amino - 2 - trifluoromethyl - 4 - bromoanthraquinone, 4.3 grams of 2,2-difluoropropylamine, 3 grams of potassium acetate, 0.1 gram of copper sulfate and 100 cc. of n-butyl alcohol are heated under reflux until no further color change takes place. The reaction mixture is filtered while hot and the filtrate is concentrated by distillation under reduced pressure to about 40-45 cc. Upon cooling, 1-amino-2-trifluoromethyl - 4 - 2,2 - difluoropropylamino - anthraquinone precipitates out and is recovered by filtration. It colors cellulose acetate textile materials violet shades from an aqueous suspension.

*Example 9*

10 grams of 1 - amino - 2 - trifluoromethyl - 4 - bromoanthraquinone, 4 grams of 3,3 - difluoropropylamine, 3 grams of potassium acetate, 0.1 gram of copper sulfate and 100 cc. of n-butyl alcohol are reacted together and worked up in the manner described in Example 8. 1-amino-2-trifluoromethyl - 4 - 3,3 - difluoropropylamino-anthraquinone is obtained. It colors cellulose acetate textile materials violet shades from an aqueous suspension.

*Example 10*

10 grams of 1 - amino - 2 - trifluoromethyl - 4 - bromoanthraquinone, 5 grams of 3,3,3-trifluoropropylamine, 3 grams of potassium acetate, 0.1 gram of copper sulfate and 100 cc. of n-butyl alcohol are reacted together and worked up as described in Example 6. 1-amino-2-trifluoromethyl - 4 - 3,3,3 - trifluoropropylamino - anthraquinone is obtained. It colors cellulose acetate textile materials red-blue shades.

*Example 11*

10 grams of 1 - amino - 2 - trifluoromethyl - 4 - bromoanthraquinone, 5 grams of 1,1-difluoro-2-aminopropane, 3 grams of potassium acetate, 0.1 gram of copper sulfate and 100 cc. of n-butyl alcohol reacted together and the reaction mixture is worked up as described in Example 6. 1-amino - 2 - trifluoromethyl - 4 - α - difluoromethylethylamino-anthraquinone is obtained. It has the formula:

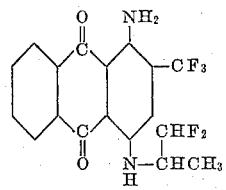

and colors cellulose acetate textile materials violet shades.

*Example 12*

10 grams of 1 - β - hydroxyethylamino - 2 - trifluoromethyl - 4 - bromoanthraquinone, 3.7 grams of 2,2-difluoroethylamine, 3 grams of potassium acetate, 0.1 gram of copper sulfate and 100 cc. of n-amyl alcohol are reacted together and the reaction mixture is worked up as described in Example 3. 1-β-hydroxyethylamino-2-trifluoromethyl - 4 - 2,2 - difluoroethylamino - anthraquinone is obtained. It colors cellulose acetate textile materials red-blue shades.

By the use of 4 grams of 1,1-difluoro-2-aminopropane in place of 2,2-difluoroethylamine in the foregoing example 1 - β - hydroxyethylamino - 2 - trifluoromethyl - 4 - α - difluoromethylethylamino-anthraquinone which colors cellulose acetate textile material red-blue shades is obtained.

*Example 13*

10 grams of 1-γ-hydroxypropylamino - 2 - trifluoromethyl-4-bromoanthraquinone, 4.7 grams of 2,2,2 - trifluoroethylamine, 3 grams of potassium acetate, 0.1 gram of copper sulfate and 100 cc. of n-butyl alcohol are heated together under reflux until no further change toward the red-blue occurs. The reaction mixture is worked up as described in Example 6 to obtain 1-γ-hydroxypropylamino - 2 - trifluoromethyl - 4 - 2,2,2-trifluoroethylamino-anthraquinone which colors cellulose acetate textile materials red-blue shades.

By the use of 4.8 grams of 3,3,3-trifluoropropylamine in place of 2,2,2-trifluoroethylamine in the foregoing example 1-γ-hydroxypropylamino-2-trifluoromethyl - 4 - 3,3,3 - trifluoropropylaminoanthraquinone which colors cellulose acetate textile materials blue shades is obtained.

*Example 14*

10 grams of 1-γ-hydroxypropylamino-2-trifluoromethyl-4-bromoanthraquinone, 3.8 grams of 2,2-difluoroethylamine, 100 cc. of n-butyl alcohol, 3 grams of potassium acetate and 0.1 gram of copper sulfate are heated together under reflux until no further change toward the red-blue occurs. The reaction mixture is worked up as described in Example 6 to obtain 1-γ-hydroxypropylamino - 2 - trifluoromethyl - 4 - 2,2 - difluoroethylamino-anthraquinone which colors cellulose acetate textile materials red-blue shades.

By the use of 3.9 grams of 3,3-difluoropropylamine in place of 2,2-difluoroethylamine in the foregoing example 1-γ-hydroxypropylamino-2-trifluoromethyl - 4 - 3,3 - difluoropropylaminoanthraquinone which colors cellulose acetate textile materials blue shades is obtained.

*Example 15*

10 grams of 1-β-hydroxypropylamino - 2 - trifluoromethyl-4-bromoanthraquinone, 4.7 grams of 2,2,2-trifluoroethylamine, 100 cc. of n-butyl alcohol, 3 grams of potassium acetate and 0.1 gram of copper sulfate are heated together under reflux until no further color change toward the red-blue occurs. The reaction mixture is worked up as described in Example 6 to obtain 1-β-hydroxypropylamino - 2 - trifluoromethyl - 4 - 2,2,2 - trifluoroethylamino - anthraquinone which colors cellulose acetate textile materials red-blue shades.

By the use of 4.8 grams of 2,2-difluoropropylamine in place of 2,2,2-trifluoroethylamine in the foregoing example 1-β-hydroxypropylamino-2-trifluoromethyl - 4 - 2,2 - difluoropropylamino-anthraquinone which colors cellulose acetate textile materials blue shades is employed.

Example 16

10 grams of 1-β-hydroxypropylamino-2-trifluoromethyl - 4 - bromoanthraquinone, 3 grams of potassium acetate, 0.1 gram of copper sulfate, 100 cc. of n-butyl alcohol and 3.8 grams of 2,2-difluoroethylamine are heated under reflux until no further color change takes place. The reaction mixture is worked up as described in Example 6 to obtain 1-β-hydroxypropylamino-2-trifluoromethyl-4-2,2-difluoroethylamino - anthraquinone which colors cellulose acetate textile materials red-blue shades.

By the use of 3.9 grams of 3,3-difluoropropylamine in place of 2,2-difluoroethylamine in the foregoing example 1-β-hydroxypropylamino - 2 - trifluoromethyl-4-3,3 - difluoropropylamino - anthraquinone which colors cellulose acetate textile materials blue shades is obtained.

Example 17

10 grams of 1-β,γ-dihydroxypropylamino-2-trifluoromethyl-4-bromoanthraquinone, 3 grams of potassium acetate, 0.1 gram of copper sulfate, 100 cc. of n-butyl alcohol and 4.6 grams of 2,2,2-trifluoroethylamine are heated together under reflux until no further color change toward the red-blue occurs. The reaction mixture is worked up as described in Example 6 to obtain 1-β,γ-dihydroxypropylamino - 2 - trifluoromethyl-4-2,2,2-trifluoroethylamino-anthraquinone which colors cellulose acetate red-blue shades.

By the use of 4.8 grams of 2,2-difluoropropylamine in place of 2,2,2-trifluoroethylamine in the foregoing example 1-β,γ-dihydroxypropylamino-2-trifluoromethyl - 4 - 2,2, - difluoropropylamino-anthraquinone which colors cellulose acetate textile materials blue shades is obtained.

Example 18

10 grams of 1-β,γ-dihydroxypropylamino-2-trifluoromethyl-4-bromoanthraquinone, 3 grams of potassium acetate, 0.1 gram of copper sulfate, 100 cc. of n-butyl alcohol and 3.7 grams of 2,2-difluoroethylamine are heated together under reflux until no further color change toward the red-blue occurs. The reaction mixture is worked up as described in Example 5 to obtain 1-β,γ-dihydroxypropylamino - 2 - trifluoromethyl-4-2,2-difluoroethylamino - anthraquinone which colors cellulose acetate textile materials red-blue shades.

By the use of 3.8 grams of 3,3-difluoropropylamine in place of 2,2-difluoroethylamine in the foregoing example 1-β,γ-dihydroxypropylamino-2-trifluoromethyl - 4 - 3,3 - difluoropropylamino-anthraquinone which colors cellulose acetate textile materials blue shades is obtained.

Similarly, by the use of 9.5 grams of 1-methylamino - 2 - trifluoromethyl - 4 - bromoanthraquinone in place of 1-β,γ-dihydroxypropylamino-2-trifluoromethyl - 4 - bromoanthraquinone in the foregoing example 1-methylamino - 2 - trifluoromethyl-4-2,2-difluoroethylamino - anthraquinone is obtained. It colors cellulose acetate textile materials red-blue shades.

Example 19

10 grams of 1-ethylamino-2-trifluoromethyl-4-bromoanthraquinone, 3 grams of potassium acetate, 0.1 gram of copper sulfate, 100 cc. of n-butyl alcohol and 4.8 grams of 2,2,2-trifluoroethylamine are heated together under reflux until no further color change toward the red-blue occurs. The reaction mixture is worked up as described in Example 6 to obtain 1 - ethylamino - 2 - trifluoromethyl - 4 - 2,2,2-trifluoroethylamino-anthraquinone which colors cellulose acetate textile materials red-blue shades.

By the use of 4.9 grams of 1,1,1-trifluoroethyl-2-aminopropane in place of 2,2,2-trifluoroethylamine in the foregoing example 1-ethylamino-2-trifluoromethyl - 4 - α - trifluoromethylethylamino-anthraquinone is obtained. It colors cellulose acetate textile materials blue shades.

Example 20

10 grams of 1-ethylamino-2-trifluoromethyl-4-bromoanthraquinone, 3 grams of potassium acetate, 0.1 gram of copper sulfate, 100 cc. of n-butyl alcohol and 4 grams of 2,2-difluoroethylamine are heated together under reflux until no further color change toward the red-blue occurs. The reaction mixture is worked up as described in Example 6 to obtain 1-ethylamino - 2 - trifluoromethyl - 4 - 2,2 - difluoroethylamino-anthraquinone which colors cellulose acetate textile materials red-blue shades.

Example 21

10 grams of 1 - n - propylamino - 2 - trifluoromethyl-4-bromo-anthraquinone, 3 grams of potassium acetate, 0.1 gram of copper sulfate, 100 cc. of n-butyl alcohol and 4.7 grams of 2,2,2-trifluoroethylamine are heated together under reflux until no further color change toward the red-blue occurs. The reaction mixture is worked up as described in Example 5 to obtain 1-n-propylamino - 2 - trifluoromethyl-4-2,2,2-trifluoroethylamino-anthraquinone which colors cellulose acetate textile materials red-blue shades.

By the use of 10 grams of 1-isopropylamino-2-trifluoromethyl-4-bromo-anthraquinone in place of 1-n-propylamino-2-trifluoromethyl-4-bromoanthraquinone in the foregoing example 1-isopropylamino-2-trifluoromethyl - 4 - 2,2,2 - trifluoroethylamino-anthraquinone is obtained. It colors cellulose acetate textile materials blue shades.

Example 22

10 grams of 1-n-propylamino-2-trifluoromethyl-4-bromoanthraquinone, 3 grams of potassium acetate, 0.1 gram of copper sulfate, 100 cc. of n-butyl alcohol and 3.9 grams of 2,2-difluoroethylamine are heated together under reflux until no further color change toward the red-blue occurs. The reaction mixture is worked up as described in Example 5 to obtain 1-n-propylamino-2-trifluoromethyl - 4 - 2,2 - difluoroethylamino - anthraquinone which colors cellulose acetate textile materials red-blue shades.

By the use of 10 grams of 1-isopropylamino-2-trifluoromethyl-4-bromoanthraquinone in place of 1-n-propylamino-2-trifluoroethyl-4-bromoanthraquinone in the foregoing example 1-isopropylamino - 2 - trifluoromethyl - 4 - 2,2 - difluoroethylamino-anthraquinone which colors cellulose acetate textile materials red-blue shades is obtained.

*Example 23*

10 grams of 1-n-butylamino-2-trifluoromethyl-4-bromoanthraquinone, 3 grams of potassium acetate, 0.1 gram of copper sulfate, 100 cc. of n-butyl alcohol and 4.6 grams of 2,2,2-trifluoroethylamine are heated together under reflux until no further color change toward the red-blue occurs. The reaction mixture is worked up as described in Example 5 to obtain 1-n-butylamino-2 - trifluoromethyl - 4 - 2,2,2 - trifluoroethylamino-anthraquinone which colors cellulose acetate textile materials red-blue shades.

By the use of 4.7 grams of 1,1,1-trifluoro-2-aminopropane in place of 2,2,2-trifluoroethylamine in the foregoing example 1-n-butylamino-2 - trifluoromethyl - 4-α - trifluoromethylethylamino-anthraquinone is obtained. It colors cellulose acetate textile materials red-blue shades.

*Example 24*

10 grams of 1-n-butylamino-2-trifluoromethyl-4-bromoanthraquinone, 3.8 grams of 2,2-difluoroethylamine, 3 grams of potassium acetate, 0.1 gram of cupric acetate and 100 cc. of n-amyl alcohol are refluxed together until no further color change toward the red-blue takes place. The reaction mixture is worked up in accordance with the general procedure described in Example 6 to obtain 1-n-butylamino-2-trifluoromethyl-4 - 2,2 - difluoroethylamino - anthraquinone which colors cellulose acetate textile materials red-blue shades.

By the use of 4 grams of 1,1-difluoro-2-aminopropane in place of 2,2-difluoroethylamine in the foregoing example 1-n-butylamino-2-trifluoromethyl - 4 - α - difluoromethylethlyamino - anthraquinone which colors cellulose acetate textile materials red-blue shades is obtained.

*Example 25*

10 grams of 1-β-hydroxyethoxyethylamino-2-trifluoromethyl-4-bromoanthraquinone, 4 grams of 2,2-difluoroethylamine, 3 grams of potassium acetate, 0.1 gram of cupric bromide and 100 cc. of n-butyl alcohol are refluxed together until no further color change takes place. The reaction mixture is worked up in accordance with the general procedure described in Example 6 to obtain 1-β-hydroxyethoxyethylamino-2-trifluoromethyl - 4 - 2,2 - difluoroethylamino - anthraquinone which colors cellulose acetate textile materials red-blue shades.

By the use of 4.3 grams of 3,3-difluoropropylamine in place of 2,2-difluoroethylamine in the foregoing example 1 - β - hydroxyethoxyethylamino - 2 - trifluoromethyl - 4-3,3 - difluoropropylamino-anthraquinone which colors cellulose acetate textile materials blue shades is obtained.

*Example 26*

10 grams of 1-β-hydroxyethoxy-β-ethoxyethylamino-2-trifluoromethyl-4-bromoanthraquinone, 3.6 grams of 2,2-difluoroethylamine, 100 cc. of pyridine, 3 grams of potassium acetate and 1 gram of copper sulfate are heated together under reflux until no further color change occurs. The reaction mixture is worked up in accordance with the general procedure described in Example 6 to obtain 1-β-hydroxyethoxy-β-ethoxyethylamino-2 - trifluoromethyl - 4-2,2 - difluoroethylamino-anthraquinone which colors cellulose acetate textile materials red-blue shades.

By the use of 3.8 grams of 3,3-difluoropropylamine and 4 grams of 3,3-difluorobutylamine, respectively in place of 2,2-difluoroethylamine in the foregoing example 1-β-hydroxyethoxy-β-ethoxyethylamino - 2 - trifluoromethyl - 4 - 3,3 - difluoropropylamino-anthraquinone and 1-β-hydroxyethoxy - β - ethoxyethylamino - 2 - trifluoromethyl - 4 - 3,3 - difluorobutylamino - anthraquinone, respectively, are obtained. Each of these compounds colors cellulose acetate textile materials blue shades.

100 cc. of n-butyl alcohol may be used in the foregoing example in place of pyridine. Similarly, 0.1 gram of cupric acetate, cupric chloride or cupric iodide can be used as a catalyst in place of copper sulfate.

*Example 27*

10 grams of 1-methylamino-2-trifluoromethyl-4-bromo-anthraquinone, 3 grams of potassium acetate, 0.1 gram of copper sulfate, 100 cc. of n-butyl alcohol and 4.5 grams of 3,3-difluorobutylamine are refluxed together until no further color change takes place. The reaction mixture is worked up in accordance with the general procedure described in Example 6 to obtain 1-methylamino-2-trifluoromethyl-4-3,3-difluorobutylamino-anthraquinone which colors cellulose acetate textile materials blue shades.

By the use of 4.2 grams of 1,1-difluoro-2-aminopropane in place of 3,3-difluorobutylamine in the foregoing example 1-methylamino-2-trifluoromethyl-4-α-difluoromethylethylamino - anthraquinone which colors cellulose red-blue shades is obtained.

*Example 28*

10 grams of 1-ethylamino-2-trifluoromethyl-4-bromoanthraquinone, 3 grams of potassium acetate, 0.1 gram of copper sulfate, 100 cc. of n-butyl alcohol and 4.1 grams of 3,3-difluoropropylamine are heated together under reflux until no further color change takes place. The reaction mixture is worked up in accordance with the general procedure described in Example 6 to obtain 1 - ethylamino - 2 - trifluoromethyl-4-3,3-difluoropropylamino-anthraquinone which colors cellulose acetate textile materials blue shades.

By the use of 4.4 grams of 3,3-difluorobutylamine in place of 2,2-difluoroethylamine in the foregoing example 1 - ethylamino - 2 - trifluoromethyl-4-3,3-difluorobutylamino-anthraquinone which colors cellulose acetate textile materials blue shades is obtained.

*Example 29*

10 grams of 1-β-hydroxyethylamino-2-trifluoromethyl-4-bromoanthraquinone, 3 grams of potassium acetate, 0.1 gram of copper sulfate, 100 cc. of n-butyl alcohol and 4 grams of 2,2-difluoropropylamine are heated together under reflux until no further color change occurs. The reaction mixture is worked up in accordance with the general procedure described in Example 2 to obtain 1 - β-hydroxyethylamino-2-trifluoromethyl-4-2,2-difluoropropylamino-anthraquinone which colors cellulose acetate textile materials red-blue shades.

By the use of 4.0 grams of 3,3-difluoropropylamine and 4.2 grams of 3,3-difluorobutylamine, respectively, in the foregoing example 1-β-hydroxyethylamino-2-trifluoromethyl-4-3,3-difluoropropylamino-anthraquinone and 1-β-hydroxyethylamino-2-trifluoromethyl-4-3,3 - difluorobutylamino-anthraquinone, respectively, are obtained. Each of these compounds colors cellulose acetate textile materials blue shades.

*Example 30*

10 grams of 1-β-hydroxyethylamino-2-trifluoromethyl-4-bromoanthraquinone, 3 grams of potassium acetate, 0.1 gram of copper sulfate, 100 cc. of n-butyl alcohol and 4.3 grams of 3,3,3-trifluoropropylamine are heated together under reflux until no further color change occurs. The reaction mixture is worked up in accordance with the general procedure described in Example 6 to obtain 1 - β-hydroxyethylamino-2-trifluoromethyl - 4 - 3,3,3-trifluoropropylamino-anthraquinone which colors cellulose acetate textile materials blue shades.

By the use of 4.3 grams of 1,1,1-trifluoro-2-aminopropane in place of 3,3,3-trifluoropropylamine in the foregoing example 1-β-hydroxyethylamino-2-trifluoromethyl-4-α-trifluoromethylethylamino-anthraquinone which colors cellulose acetate textile materials blue shades is obtained.

*Example 31*

10 grams of 1-isopropylamino-2-trifluoromethyl-4-bromo-anthraquinone, 3 grams of potassium acetate, 0.1 gram of copper sulfate, 100 cc. of n-butyl alcohol and 4.3 grams of 3,3,3-trifluoropropylamine are heated together under reflux until no further color change occurs. The reaction mixture is worked up as described in Example 6 to obtain 1-isopropylamino-2-trifluoromethyl-4-3,3,3-trifluoropropylamino - anthraquinone which colors cellulose acetate textile materials blue shades.

By the use of 4.1 grams of 3,3-difluoropropylamine and 4.4 grams of 3,3-difluorobutylamine, respectively, in place of 3,3,3-trifluoropropylamine in the foregoing example 1-isopropylamino - 2 - trifluoromethyl-4-3,3-difluoropropylamino-anthraquinone and 1-isopropylamino-2-trifluoromethyl - 4 - 3,3 - difluorobutylamino-anthraquinone, respectively, are obtained. Each of these compounds colors cellulose acetate textile materials blue shades.

*Example 32*

10 grams of 1-n-butylamino-2-trifluoromethyl-4-bromoanthraquinone, 3 grams of potassium acetate, 0.1 gram of copper sulfate, 100 cc. of n-butyl alcohol and 4 grams of 3,3-difluoropropylamine are heated together under reflux until no further color change occurs. The reaction mixture is worked up in accordance with the procedure described in Example 5 to obtain 1-n-butylamino-2-trifluoromethyl-4-3,3-difluoropropylamino-anthraquinone which colors cellulose acetate textile materials blue shades.

By the use of 4.3 grams of 3,3-difluorobutylamine in place of 3,3-difluoropropylamine in the foregoing example 1-n-butylamino-2-trifluoromethyl - 4-3,3-difluorobutylamino-anthraquinone which colors cellulose acetate textile materials blue shades is obtained.

*Example 33*

10 grams of 1-β-hydroxypropylamino-2-trifluoromethyl-4-bromoanthraquinone, 3 grams of potassium acetate, 0.1 gram of copper sulfate, 100 cc. of n-butyl alcohol and 4 grams of 3,3,3-trifluoroethylamine are heated together under reflux until no further color change occurs. The reaction mixture is worked up in accordance with the general procedure described in Example 5 to obtain 1-β-hydroxypropylamino-2-trifluoromethyl - 4 - 3,3,3 - trifluoropropylamino - anthraquinone which colors cellulose acetate textile materials blue shades.

By the use of 4 grams of 3,3-difluorobutylamine in place of 3,3,3-trifluoropropylamine in the foregoing example 1-β-hydroxypropylamino-2 - trifluoromethyl - 4 - 3,3 - difluorobutylamino-anthraquinone which colors cellulose acetate textile materials blue shades is obtained.

*Example 34*

10 grams of 1-γ-hydroxypropylamino-2-trifluoromethyl-4-bromoanthraquinone, 3 grams of potassium acetate, 0.1 gram of copper sulfate, 100 cc. of n-butyl alcohol and 4 grams of 3,3-difluorobutylamine are heated together under reflux until no further color change occurs. The reaction mixture is worked up in accordance with the procedure described in Example 5 to obtain 1-γ-hydroxypropylamino - 2 - trifluoromethyl - 4 - 3,3 - difluorobutylamino-anthraquinone which colors cellulose acetate textile materials blue shades.

By the use of 4 grams of 1,1,1-trifluoro-2-aminopropane in place of 3,3-difluorobutylamine in the foregoing example 1-γ-hydroxypropylamino - 2 - trifluoromethyl - 4 - α - trifluoromethylethylamino-anthraquinone which colors cellulose acetate textile materials red-blue shades is obtained.

*Example 35*

10 grams of 1-β,γ-dihydroxypropylamino-2-trifluoromethyl - 4 - bromoanthraquinone, 4.2 grams of 3,3,3-trifluoropropylamine, 100 cc. of n-butyl alcohol, 3 grams of potassium acetate and 0.1 gram of cupric acetate are heated together under reflux until no further color change occurs. The reaction mixture is filtered while hot and then concentrated by distillation under reduced pressure to about 40 cc. Upon cooling, 1 - β,γ - dihydroxypropylamino - 2 - trifluoromethyl - 4 - 3,3,3 - trifluoropropylamino - anthraquinone precipitates out and is recovered by filtration. It colors cellulose acetate textile materials blue shades.

By the use of 4.1 grams of 3,3-difluorobutylamine in place of 3,3,3-trifluoropropylamine in the foregoing example 1-β,γ-dihydroxypropylamino - 2 - trifluoromethyl - 4 - 3,3 - difluorobutylamino-anthraquinone which colors cellulose acetate textile materials blue shades is obtained.

*Example 36*

10 grams of 1-methylamino-2-trifluoromethyl-4-bromoanthraquinone, 4.2 grams of 2,2-difluoropropylamine, 100 cc. of n-butyl alcohol, 3 grams of potassium acetate and 0.1 gram of cupric acetate are heated together under reflux until no further color change occurs. The reaction mixture is filtered while hot and then concentrated by distillation under reduced pressure to about 40 cc. Upon cooling 1-methylamino-2-trifluoromethyl - 4 - 2,2 - difluoropropylamino-anthraquinone precipitates out and is recovered by filtration. It colors cellulose acetate textile materials blue shades.

By the use of 4.2 grams of 3,3-difluoropropylamine in place of 2,2-difluoropropylamine in the foregoing example 1-methylamino-2-trifluoromethyl - 4 - 3,3 - difluoropropylamino - anthraquinone which colors cellulose acetate textile materials blue shades is obtained.

Example 37

10 grams of 1-methylamino-2-trifluoromethyl-4-bromoanthraquinone, 4.5 grams of 3,3,3-trifluoropropylamine, 100 cc. of n-butyl alcohol, 3 grams of potassium acetate and 0.1 gram of copper sulfate are heated together under reflux until no further color change occurs. The reaction mixture is worked up in accordance with the procedure described in Example 36 to obtain 1 - methylamino - 2 - trifluoromethyl - 4 - 3,3,3-trifluoropropylamino-anthraquinone which colors cellulose acetate textile materials blue shades.

By the use of 4.5 grams of 1,1,1-trifluoro-2-aminopropane in place of 3,3,3-trifluoropropylamine in the foregoing example 1-methylamino-2 - trifluoromethyl - 4 - α - trifluoromethylethylamino-anthraquinone which colors cellulose acetate textile materials blue shades is obtained.

Example 38

10 grams of 1-n-butylamino-2-trifluoromethyl-4-bromoanthraquinone, 5 grams of 3,3-difluorobutylamine, 100 cc. of n-butyl alcohol, 3 grams of potassium acetate and 0.1 gram of copper sulfate are heated together under reflux until no further color change occurs. The reaction mixture is worked up in accordance with the procedure described in Example 36 to obtain 1-n-butylamino - 2 - trifluoromethyl - 4 - 3,3 - difluorobutylamino-anthraquinone which colors cellulose acetate textile materials blue shades.

By the use of 5 grams of 3,3,3-trifluoropropylamine in place of 3,3-difluorobutylamine in the foregoing example 1-n-butylamino-2-trifluoromethyl - 4 - 3,3,3 - trifluoropropylamino - anthraquinone which colors cellulose acetate textile materials blue shades is obtained.

Example 39

10 grams of 1-β,γ-dihydroxypropylamino-2-trifluoromethyl-4-bromoanthraquinone, 4.2 grams of 1,1,1-trifluoro-2-aminopropane, 100 cc. of n-butyl alcohol, 3 grams of potassium acetate and 0.1 gram of copper sulfate are heated together under reflux until no further color change occurs. The reaction mixture is filtered while hot and then concentrated by distillation under reduced pressure to about 40 cc. Upon cooling 1-β,γ-dihydroxypropylamino - 2 - trifluoromethyl-4-α-trifluoromethylethylamino - anthraquinone which colors cellulose acetate textile materials red-blue shades is obtained.

By the use of 3.9 grams of 1,1-difluoro-2-aminopropane in place of 1,1,1-trifluoro-2-aminopropane in the foregoing example 1-β,γ-dihydroxypropylamino-2-trifluoromethyl - 4 - α - difluoromehylethylamino - anthraquinone which colors cellulose acetate textile materials red-blue shades is obtained.

Many but not all of the limited number of compounds of our invention have been specifically disclosed in the foregoing examples. However, it is to be clearly understood that any of the members represented by R can be present in the compound with any of the members represented by R₁. Thus, compounds of our invention not specifically disclosed are prepared in accordance with the general disclosure given herein supplemented by the numerous examples illustrating the manner in which the compounds of our invention are prepared.

The anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 65° C.–90° C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art the intensity of dyeing can be varied by varying the proportion of dye to material undergoing coloration. The amount of dye used can be, for example, ⅓% to 3% (by weight) of that of the textile material, although lesser or greater amounts of dye can be used.

The term copper sulfate as used in the foregoing examples is intended to mean $CuSO_4 \cdot 5H_2O$.

In order that the preparation of the anthraquinone compounds of our invention may be entirely clear, the preparation of various intermediate compounds used in their manufacture is described hereinafter.

Compounds having the formula:

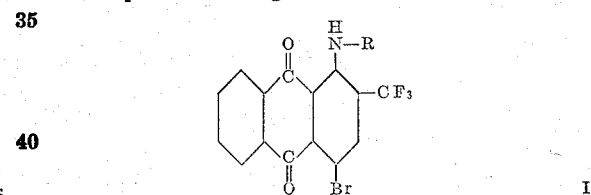

I wherein R has the meaning previously assigned to it are prepared by brominating a compound having the formula:

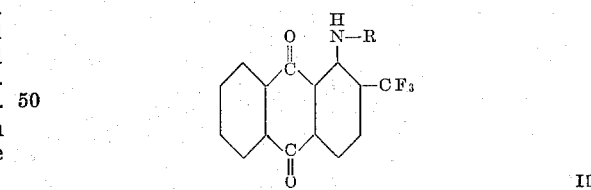

II wherein R has the meaning previously assigned to it. The bromination is carried out in an inert diluent such as pyridine at a temperature of about 100° C. using bromine as the brominating agent. Preferably an excess (5–10 per cent) of bromine is employed. The time required for the bromination is ordinarily 5 to 6 hours. The process will be illustrated with reference to the preparation of 1-methylamino-2-trifluoromethyl-4-bromoanthraquinone.

Example A 25 parts of 1-methylamino-2-trifluoromethylanthraquinone are dissolved in 149 parts of pyridine and brominated at 100° C. with bromine (5–10 per cent excess over the amount theoretically required) for 5 to 6 hours. The reaction mixture is then cooled. The 1-methylamino-2-trifluoromethyl - 4 - bromoanthraquinone formed in the reaction crystallizes out and is recovered by filtration. It can be used as obtained in purer form by recrystallization from pyridine.

In an exactly similar way by the use of an equivalent molecular weight of another compound of Formula II for 1-methylamino-2-trifluoromethylanthraquinone in Example A, other compounds of Formula I are readily prepared. Thus, by using an equivalent molecular weight of 1-amino-2-trifluoromethylanthraquinone, 1-β-hydroxyethylamino-2-trifluoromethylanthraquinone, 1-β-hydroxyethoxyethylamino-2-trifluoromethylanthraquinone, etc., respectively, in place of 1-methylamino-2-trifluoromethylanthraquinone in Example A 1-amino-2-trifluoromethyl-4-bromoanthraquinone, 1-β-hydroxyethylamino-4-bromoanthraquinone, 1-β-hydroxyethoxyethylamino-4-bromoanthraquinone, etc., respectively, are obtained.

Compounds having the Formula I can also be prepared by brominating a compound having the Formula II in accordance with the general procedure illustrated hereinafter with reference to the preparation of 1-amino-2-trifluoromethyl-4-bromoanthraquinone.

*Example B.—1-amino-2-trifluoromethyl-4-bromoanthraquinone*

146 grams of 1-amino-2-trifluoromethylanthraquinone are dissolved in 250 grams of sulfuric acid (sp. gr. 1.84) at about 50° C–60° C. The resulting solution is poured with good stirring into 3.5 liters of water containing 5 grams of ferrous sulfate. To this mixture is then added with vigorous stirring 88 grams of bromine over a period of 4 hours at 55° C.– 60° C. and the reaction mixture is stirred for about 5 hours after the addition of the bromine. By the use of a slight positive pressure the time needed for bromination can be reduced. 1-amino-2-trifluoromethyl-4-bromoanthraquinone is recovered by filtration as an orange red solid. It is washed well and dried. The yield obtained is nearly quantitative.

As above stated, the general procedure described in Example B can be used to prepare other compounds having the Formula I. To illustrate, by the use of an equivalent molecular weight of another compound of Formula II for 1-amino-2-trifluoromethylanthraquinone in Example B other compounds of Formula I are readily prepared. Thus, by using an equivalent molecular weight of 1-n-butylamino-2-trifluoromethylanthraquinone and 1-β-hydroxyethoxyethylamino-2-trifluoromethylanthraquinone, respectively, in place of 1-amino-2-trifluoromethylanthraquinone in Example B 1-n-butylamino-2-trifluoromethyl-4-bromoanthraquinone and 1-β-hydroxyethoxyethylamino - 2 - trifluoromethyl - 4-bromoanthraquinone, respectively, are obtained.

Compounds having the Formula II are prepared by reacting 1-chloro-2-trifluoromethylanthraquinone with a primary amine having the formula: $H_2N—R$, wherein R has the meaning previously assigned to it. The following example is illustrative of the manner in which compounds having the Formula II are prepared.

*Example C.—1-β-hydroxyethylamino-2-trifluoromethylanthraquinone*

30.7 parts of 1 - chloro - 2 - trifluoromethylanthraquinone, 250 parts of pyridine and 15 parts of ethanolamine in 20 parts of water are mixed and heated together in a shaking autoclave for 6 hours at 140° C. The reaction mixture is removed from the autoclave when at about a temperature of 75° C. and allowed to cool. Upon cooling 1-β-hydroxyethylamino-2-trifluoromethylanthraquinone crystallizes out and is recovered by filtration, washed well with water and dried. It is a reddish-brown solid that colors cellulose acetate textile materials red shades from an aqueous suspension. The yield is about 95 per cent.

By the use of an equivalent molecular weight of another amine of the formula: $H_2N—R_1$, wherein $R_1$ has the meaning previously assigned to it other compounds of the Formula II are readily obtained. Thus, by the use of methylamine and ethylamine, respectively, 1-methylamino - 2 - trifluoromethylanthraquinone and 1 - ethylamino - 2 - trifluoromethylanthraquinone, respectively, are obtained. Ammonia is ordinarily used in the form of ammonium hydroxide. Thus, by the use of strong ammonium hydroxide in Example B in place of ethanolamine 1-amino-2-trifluoromethylanthraquinone is obtained.

The preparation of 1-chloro-2-trifluoromethylanthraquinone is described in Example 2 of German Patent 713,745. 1-amino-2-trifluoromethylanthraquinone is disclosed in U. S. Patent 2,061,186. Neither of these two patents, however, discloses anthraquinone compounds of the character described and claimed by us.

Certain amines of the formula: $H_2N—R_1$, wherein $R_1$ has the meaning previously assigned to it are new compounds. The preparation of these new compounds is described hereinafter.

In general, the above-identified amine compounds are prepared by reacting concentrated aqueous ammonia with a fluorinated alkyl halide (Cl, Br or I) compound corresponding to the amine compound to be prepared. 2,2,2,-trifluoroethylamine and 3,3,3,-trifluoropropylamine are specifically disclosed in U. S. Patent 2,348,321. The example given in this patent is illustrative of the manner in which the reaction between the fluorinated alkyl halide and ammonia is carried out. Ordinarily, the fluorinated alkyl halide employed is a fluorinated alkyl chloride.

2,2-difluoroethylamine is disclosed in Bull. sci. acad. roy. Belg., page 762 (1904). It can also be prepared by reacting $CHF_2CH_2Cl$, $CHF_2CH_2Br$ or $CHF_2CH_2I$ (all known compounds) with aqueous ammonia. Similarly 3,3-difluorobutylamine can be prepared by reacting the known compound $CH_3CF_2CH_2CH_2Cl$ with aqueous ammonia. The reactions just referred to can be carried out in accordance with the general procedure described in U. S. Patent 2,348,321.

*Preparation of 2,2-difluoropropylamine*

48 grams of $CH_3CF_2CH_2Br$, J. A. C. S. vol. 59, page 2434 (1937) are heated with 200 cc. of 28% aqueous ammonia and 1 gram of a wetting agent such as Nacconol NR (sodium alkyl naphthalene sulfonate) in a shaking autoclave at 130° C.–150° C. for 24 hours. The reaction mixture is then carefully distilled through an efficient fractionating column, $NH_3$ gas coming off first. The amine fraction distilling over from 60° C.–85° C. is then collected and dried over solid NaOH and then finally redistilled from fresh solid NaOH. 2,2-difluoropropylamine distills over at 75° C.–77° C. and has a refractive index of $N_D^{25}$ 1.362. It is a water white liquid miscible with water and with other ordinary organic solvents, and has a characteristic amine odor.

34.6 grams of $CH_3CF_2CH_2Cl$ can be substituted for the $CH_3CF_2CH_2Br$ of the foregoing example.

*Preparation of 3,3-difluoropropylamine*

130 grams of 1,1-difluoro-3-bromopropane, $CHF_2CH_2CH_2Br$, and 328 cc. of 28% aqueous ammonia were heated with shaking in an autoclave at 110° C.–120° C. for 24 hours. The autoclave was then cooled and the cooled contents were removed and poured into 5 gram moles of cold hydrochloric acid, filtered and evaporated to dryness on a water bath and under 20–30 mm. pressure. The amine salts formed were then separated from the ammonium chloride formed by extraction with 8 200 cc. portions of absolute ethyl alcohol. The ethyl alcohol solution was evaporated to dryness and treated with an aqueous solution of potassium hydroxide. (150 grams KOH and 150 cc. water.) The reaction mixture separated into two layers and was extracted with ethyl ether and dried. On distillation of the ether extract, there was obtained: 1) 3,3-difluoropropylamine which boils at 92° C.–94° C. at 760 mm. and which has a refractive index of $N_D^{20}$ 1.3650 and 2) bis-3,3-difluoropropylamine which boils at 91° C.–94° C. at 50 mm. and which has a refractive index of $N_D^{20}$ 1.3744. Both are colorless liquids.

|  | Calculated | Found |
|---|---|---|
| Analysis of 1: |  |  |
| C | 37.9 | 36.8 |
| H | 7.4 | 7.9 |
| N | 14.7 | 13.7 |
| Analysis of 2: |  |  |
| C | 41.6 | 42.0 |
| H | 6.4 | 6.6 |
| N | 8.1 | 7.9 |

*Preparation of 1,1,1-trifluoro-2-aminopropane*

1,1,1-trifluoroacetone was heated in an autoclave at 90° C.–100° C. for 5 hours with a water solution of hydroxylamine hydrochloride and sodium acetate to form the oxime. The process is substantially the same as that employed by Swarts, Bull. sci. acad. roy. Belg., page 178 (1927).

25 grams of the oxime reaction product obtained as just described was hydrogenated in ethyl ether in an autoclave under 2000 pounds hydrogen pressure using Raney nickel as a catalyst. Upon completion of the hydrogenation reaction the ether solution was filtered and the filtrate was acidified with etheral hydrogen chloride to obtain 1,1,1-trifluoro-2-aminopropane in its hydrochloride form, which was recrystallized from its solution in ethyl alcohol-ethyl ether.

Calculated for $C_3H_7ClF_3N$: C, 24.4; H, 4.7; N, 9.4. Found: C, 24.3; H, 4.6; N, 9.3.

The free amine was obtained from the amine hydrochloride by treating with an aqueous 50% KOH solution and distilling off the amine. It boils at 46° C.–47° C. at 760 mm. and has a refractive index of $N_D^{20}$ 1.3210.

1,1,1-trifluoro-2-aminopropane can also be prepared by reacting $CF_3CHBrCH_3$ with concentrated aqueous ammonia in an autoclave.

*Preparation of 1,1-difluoro-2-aminopropane*

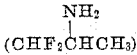

This compound is prepared in accordance with the procedure described in connection with 1,1,1-trifluoro-2-aminopropane. That is, difluoroacetone, $CHF_2COCH_3$ is converted to the oxime by treatment with a water solution of hydroxylamine hydrochloride and sodium acetate and the oxime is converted to 1,1-difluoro-2-aminopropane in accordance with the procedure used in the case of 1,1,1-trifluoro-2-aminopropane.

1,1-difluoro-2-aminopropane can also be prepared by reacting $CHF_2CHBrCH_3$ with concentrated aqueous ammonia in an autoclave.

*Preparation of 3,3-difluorobutylamine*

32.1 grams of 1-chloro-3,3-difluorobutane were placed in the glass liner of an autoclave together with 102 cc. (1.5 gram mole) of aqueous ammonia. The reactants were heated at 120° C.–125° C. with shaking for 24 hours.

The autoclave was then cooled and the contents neutralized by pouring into a small excess of iced dilute hydrochloric acid. The reaction mixture resulting was then distilled and concentrated to dryness on a steam bath under reduced pressure.

The dry residue of the amine hydrochloride and ammonium chloride was extracted four times with hot absolute ethyl alcohol. This treatment separates the alcohol soluble amine hydrochloride from the insoluble ammonium chloride. The alcohol extracts were concentrated to dryness yielding 25.4 grams (70%) of $$CH_3CF_2CH_2CH_2NH_2 \cdot HCl$$

which were further purified by crystallization from ethyl alcohol-ethyl ether.

The free amine was obtained by heating the amine hydrochloride with an excess of dimethyl aniline and distilling off the amine.

*Preparation of 1,1-difluoro-3-bromopropane*

98 grams of 1,1,3-tribromopropane $$(CHBr_2CH_2CH_2Br)$$

were placed in a 200 cc. round bottomed flask fitted with a still-head and a well-cooled receiving flask. 107 grams of dry mercuric fluoride were added to the reaction flask which was then heated gently with a free flame until reaction began. The reaction was then allowed to proceed briskly but not too vigorously (by cooling or heating as required) until all the reaction product had distilled over at about 85° C.–100° C. The crude product was then steam-distilled, dried and fractionated by distillation under reduced pressure. The main product obtained was 1,1-difluoro-3-bromopropane ($CHF_2CH_2CH_2Br$) having a boiling point of 92° C.–94° C. A yield of 35–40% of pure product was obtained. A small amount of $CH_2FCH_2CH_2Br$ was present in the still residue.

We claim:

1. The anthraquinone compounds having the formula:

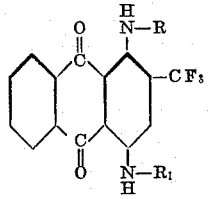

wherein R stands for a member selected from the group consisting of a hydrogen atom, an alkyl group having 1 to 4 carbon atoms, a hydroxyalkyl group having 2 to 3 carbon atoms, a —$CH_2CH_2$—O—$CH_2CH_2OH$ group and a —$CH_2CH_2$—O—$CH_2CH_2$—O—$CH_2CH_2OH$ group and $R_1$ stands for a member selected from the group consisting of a 2,2-difluoroethyl group, a 2,2-difluoropropyl group, a 3,3-difluoropropyl group, a 3,3-difluorobutyl group, a 2,2,2-trifluoroethyl group, a 3,3,3-trifluoropropyl group, an α-trifluoromethylethyl group and an α-difluoromethylethyl group.

2. The anthraquinone compound having the formula:

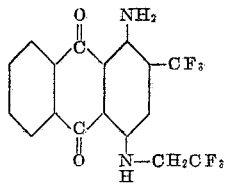

3. The anthraquinone compound having the formula:

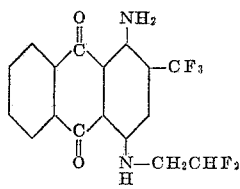

4. The anthraquinone compound having the formula:

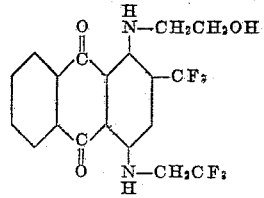

JOSEPH B. DICKEY.
EDMUND B. TOWNE.

REFERENCES CITED

The following references are of record in the file of this patent:

UNITED STATES PATENTS

| Number | Name | Date |
|---|---|---|
| 2,050,704 | Koeberle et al. | Aug. 11, 1936 |
| 2,061,186 | Cole | Nov. 17, 1936 |
| 2,085,736 | Calcott et al. | July 6, 1937 |
| 2,174,182 | Schlichenmaier et al. | Sept. 26, 1939 |
| 2,211,943 | Wilder | Aug. 20, 1940 |
| 2,333,402 | Wuertz et al. | Nov. 2, 1943 |
| 2,451,478 | Dickey et al. | Oct. 19, 1948 |

OTHER REFERENCES

Gilman, Ed. "Organic Chemistry," 2nd ed. 1943, vol. I, pp. 956, 960, 963.